United States Patent Office 3,618,488
Patented Nov. 9, 1971

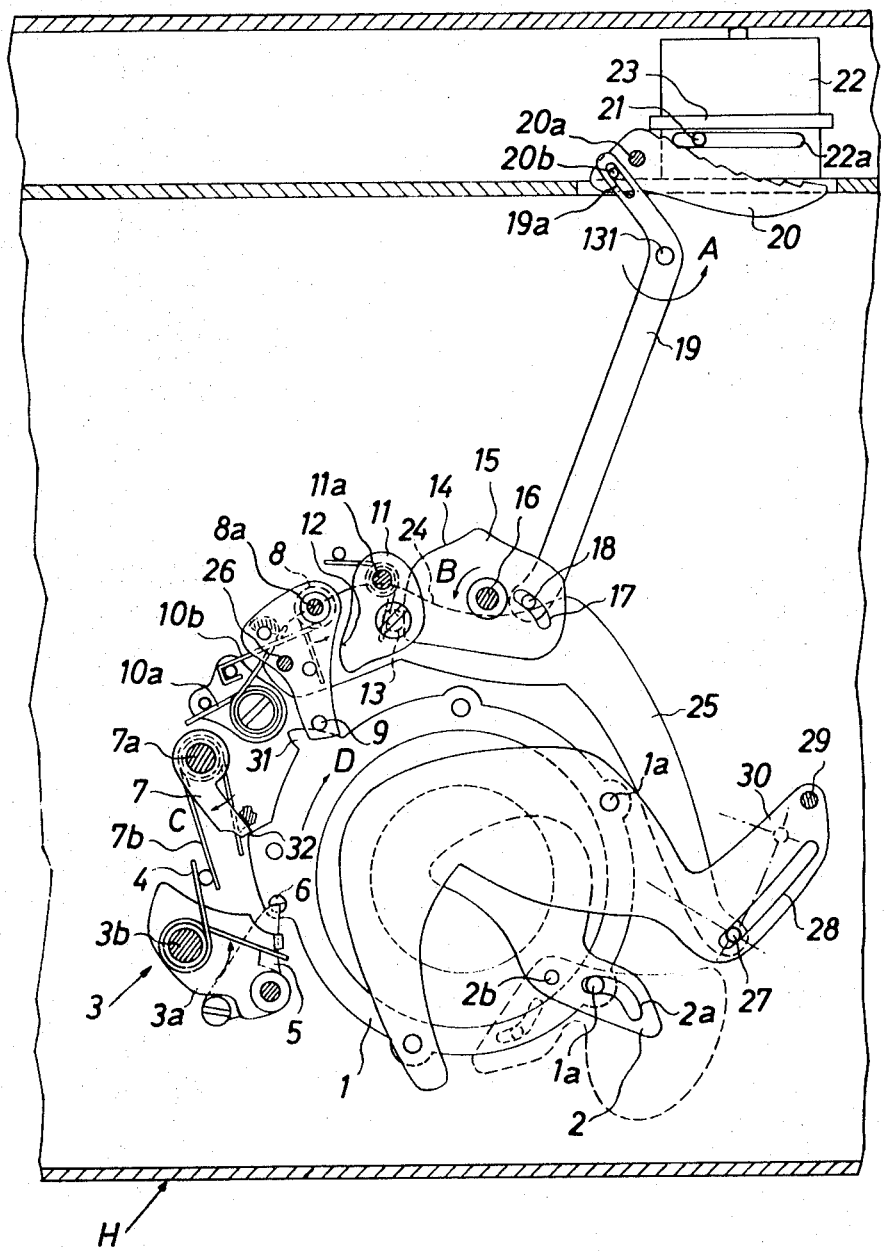

3,618,488
PHOTOGRAPHIC APPARATUS WITH BUILT-IN EXPOSURE CONTROLLING MEANS
Gunter Fauth, Unterhaching, Horst Guthke, Munich, and Willi Schulz, Schwenningen, Germany, assignor to Agfa-Gevaert Aktiengesellschaft, Leverkusen, Germany
Filed June 11, 1970, Ser. No. 45,486
Claims priority, application Germany, June 27, 1969, G 69 25 597.6
Int. Cl. G01j 1/00
U.S. Cl. 95—10 C
10 Claims

ABSTRACT OF THE DISCLOSURE

An exposure control which adjusts the shutter and the diaphragm of a photographic camera as a function of scene brightness employs a moving-coil instrument whose needle is movable in response to changes in scene brightness and can be engaged by a scanning member which thereby adjusts the diaphragms by way of two levers. The shutter has a rotary carrier for several blades and an impeller which can propel the carrier to thereby move the blades to open positions. The extent of such movement of the carrier determines the exposure time and is controlled by an arresting lever which is pivotable by the carrier and then strikes against the face of one of two cooperating timer cams the other of which is coupled to one of the levers. The faces on the timer cams are inclined in such a way that the positions of the levers, as selected by the scanning member, cannot be changed when the rotating carrier causes the arresting lever to strike against the one timer cam.

BACKGROUND OF THE INVENTION

The present invention relates to photographic apparatus in general, and more particularly to improvements in photographic apparatus with a built-in exposure control which adjusts the shutter and the diaphragm as a function of scene brightness. Still more particularly, the invention relates to improvements in an exposure control of the type wherein the intensity of scene light is measured by a moving-coil instrument having a movable output member whose position is scanned to effect appropriate adjustments of the shutter and diaphragm.

SUMMARY OF THE INVENTION

An object of the invention is to provide a photographic apparatus with a simple, compact, inexpensive and rugged exposure control which can automatically adjust the shutter and the diaphragm as a function of scene brightness.

Another object of the invention is to provide the exposure control with a novel operative connection between the output member of the light meter on the one hand and the diaphragm and shutter on the other hand.

A further object of the invention is to provide an exposure control whose shutter embodies an impeller-operated carrier for shutter blades.

The invention is embodied in a photographic apparatus whose exposure controlling means comprises a light meter having an output member which is movable between a plurality of positions as a function of changes in scene brightness, diaphragm means including at least one vane movable between a plurality of positions each corresponding to a different aperture size, shutter means including a rotary carrier, at least one blade coupled with the carrier to move from a closed to an open position in response to movement of the carrier from a starting position whereby the length of exposure time depends on the extent of movement of the carrier from its starting position, and impeller means for propelling the carrier from the starting position, scanning means displaceable into engagement with the output member of the light meter, and adjusting means for selecting the position of the vane and the extent of movement of the carrier from its starting position in response to displacement of the scanning means. The adjusting means comprises movable arresting means for the carrier, a plurality of cooperating timer cam means arranged to move to a plurality of positions in the path of movement of the arresting means in each of which the arresting means permits the carrier to move from the starting position to a different extent, and a linkage connecting the scanning means with the vane and with one of cam means.

The novel features which are considered as characteristic of the invention are set forth in particular in the appended claims. The improved exposure controlling means itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single figure of the drawing is an enlarged schematic vertical sectional view of a still camera having built-in exposure controlling means which embodies the present invention.

DESCRIPTION OF THE PREFERRED EMBODIMENTS

The drawing illustrates a portion of a still camera including a housing H which contains the improved exposure controlling means. The latter includes a light meter 22, e.g., a customary moving-coil instrument having a needle-shaped output member 21 whose position with reference to a slot 22a in the casing of the light meter 22 is a function of scene brightness. A toothed or serrated scanning member 20 is pivotable on a fixed pin 20a and can engage the needle 21 when caused to pivot in a counterclockwise direction, as viewed in the drawing. The needle 21 is then deformed and is clamped against a back support or anvil 23.

The exposure controlling means further comprises a shutter which includes a turnable ring-shaped carrier 1 for seevral shutter blades 2 (only one shown for the sake of clarity). Each blade 2 is provided with an arcuate slot 2a for a pin 1a of the carrier 1 and with a pin 2b which is mounted in a stationary part of the shutter housing. The numeral 3 denotes an impeller which includes a lever 3a turnable on a pin 3b and biased in a counterclockwise direction by a torsion spring 4. The lever 3a carries a pawl 5 which bears against a projection or abutment 6 on the carrier 1. A release lever 7 is pivotable in response to rotation of a shaft 7a and its pallet engages a shoulder 32 of the carrier 1 to maintain the latter in the illustrated starting position in which the shutter blades 2 are closed to prevent entry of scene light. The length of the exposure time depends on the extent to which the carrier 1 is permitted to move away from the illustrated starting position, i.e., the exposure time is longer if the extent of angular movement of the carrier 1 in a clockwise direction (arrow D) is greater and vice versa. Thus, when the spring 4 is capable of dissipating a greater amount of energy by moving the carrier 1 through a greater angle, the exposure time is longer. The release lever 7 is biased by a torsion spring 7b which tends to maintain it in the illustrated blocking position. The shaft 7a can be used as a means for effecting displacement of the scanning member 20 against the needle 21.

The exposure controlling means further comprises an arresting lever 8 which is pivotable on a fixed pin 8a and is biased by two torsion springs 10a, 10b opposing the bias of the spring 4 in the impeller 3.[1] The arm of the resetting lever 8 carries a post 9 which engages with and receives motion from a projection 31 on the carrier 1. A first timer cam 11 is mounted in the path of movement of the arresting lever 8 and is pivotable on a fixed pin 11a. The timer cam 11 is provided with a cam face 12 having a relatively slight slope. A follower 13 on the timer cam 11 cooperates with the slightly inclined cam face 14 of a plate-like second timer cam 15 which is pivotable on a fixed pin 16 and has an arcuate slot 17 for a motion-transmitting pin 18 on the lower arm of a two-armed connecting lever 19. The latter is pivotable on a fixed pin 131 and is coupled to the scanning member 20 by means of a pin-and-slot connection 20b, 19a.

The pin 18 of the lever 19 further constitutes the displacing or pivoting means for a diaphragm-adjusting lever 25 which is pivotable on a fixed pin 26 and has a pin 27 extending into an elongated slot 28 provided in a diaphragm vane 30. The latter is pivotable on a fixed pin 29 and determines the aperture size. The lever 25 has a cam face 24 which is engaged by the post 18. The linkage including the levers 19, 25 transmits motion to the timer cams 15, 11 and to the vane 30 in response to displacement of the scanning member 20.

The inclination of cam faces 12 and 14 is such that, when the carrier 1 is released by the member 7 so that it can turn under the action of the torsion spring 4, the impact of the post 9 on the cam face 12 cannot effect any changes in the angular positions of the cams 11 and 15. Thus, the angular position of the lever 19 is determnied exclusively by the position of the needle 21 and thus the aperture size is a function of scene brightness. This is achieved by configurating the cam faces 12, 14 and by mounting the timer cams 11, 15 in such a way that the forces developing in response to propulsion of the carrier 1 by the spring 4 act in a direction toward the axis of the pivot pin 16.

In order to make an exposure, the user of the camera causes the scanning member 20 to engage the needle 21 and to clamp it against the back support 23. The position of the needle 21 is a function of scene brightness and the scanning member 20 automatically adjusts the diaphragm vane 30 by way of the linkage including the levers 19, 25, pin 18 and pin 27 so that the aperture size is also a function of scene brightness. The direction in which the connecting lever 19 turns when the scanning member 20 moves toward engagement with the needle 21 is indicated by the arrow A. The pin 18 of the lever 19 also turns the timer cam 15 (arrow B) so that the cam 15 adjusts the timer cam 11 by way of the cam face 14 and follower 13. The cam face 12 on the timer cam 11 then determines the extent of pivotal movement of the arresting lever 8 and hence the exposure time as a function of scene brightness.

When the release 7 is turned by shaft 7a (arrow C), the impeller 3 propels the carrier 1 in a clockwise direction (arrow D) whereby the shuter blades 2 move to open positions and admit scene light which passes through the aperture defined by the vane 30 and impinges on an unexposed film frame.

When the carrier 1 rotates in the direction indicated by arrow D, the projection 31 propels the post 9 which moves against the cam face 12 whereby the torsion springs 10a and 10b store energy. These springs thereupon dissipate energy to move the carrier 1 in a counterclockwise direction. In the meantime, the spring 7b returns the release 7 to the illustrated position so that the carrier 1 is held in the starting position shown in the drawing when the pallet of the release 7 reengages the shoulder 32.

---

[1] In the initial position of the arresting leveir 8, the tension of the springs 10a and 10b is released. The spring 4 of the impeller 3 is so strong that the arresting lever 8 propels against the cam face 12. The pawl 5 disengages from the projection 6 of the carrier 1 after a certain rotation of this carrier 1 out of its starting position.

The diaphragm may comprise two or more movable vanes and the shutter may include a single blade or two blades. Furthermore, the adjusting means for determining the extent of movement of the carrier 1 from its starting position may comprise more than two cams.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, exposure controlling means comprising a light meter having an output member movable between a plurality of positions as a function of changes in scene brightness; diaphragm means including vane means movable between a plurality of positions each corresponding to a different aperture size; shutter means including a rotary carrier, at least one shutter blade coupled to said carrier to move from a closed to an open position in response to movement of said carrier from a starting position whereby the duration of exposure time depends on the extent of movement of the carrier from said starting position, and impeller means actuatable to propel the carrier from said starting position; scanning means displaceable into engagement with said output member; and adjusting means for selecting the position of said vane means and the extent of movement of said carrier from said starting position in response to displacement of said scanning means, including movable arresting means for said carrier, a plurality of cooperating timer cams movable to a plurality of positions in the path of movement of said arresting means in each of which said arresting means permits the carrier to move from said starting position to a different extent, and a linkage connecting said scanning means with said vane means and with one of said timer cam means.

2. Exposure controlling means as defined in claim 1, wherein said timer cam means are provided with cam faces one of which transmits motion from said one cam means to another cam means, another of said cam faces being provided on said other cam means in the path of movement of said arresting means, the inclination of each of said cam faces being such as to prevent changes in the position of said linkage in response to impact of said arresting means against said other cam means.

3. Exposure control means as defined in claim 1, wherein said timer cam means comprises a first turnable cam which is coupled with said linkage and is provided with a first cam face, a second turnable cam provided with a second cam face located in the path of movement of said arresting means, and follower means provided on said second cam and tracking the cam face of said first cam.

4. Exposure control means as defined in claim 1, wherein said linkage comprises a lever coupled with said scanning means and a pin-and-slot connection provided between said lever and said one timer cam means.

5. Exposure control means as defined in claim 4, wherein said linkage further comprises a second lever coupled with said vane means and having a cam face engaged by the pin of said pin-and-slot means.

6. Exposure control means as defined in claim 1, further comprising means for biasing said arresting means in a direction to return said carrier to said starting position.

7. Exposure controlling means as defined in claim 1, wherein said scanning means is pivotable and said linkage includes two levers one of which receives motion from said scanning means and transmits motion to said one timer cam means, the other lever of said linkage receiving motion from said one lever and being operatively connected with said vane means.

8. Exposure controlling means as defined in claim 1, wherein said carrier is a ring having a projection and said impeller means comprises spring-biased pawl means arranged to turn said ring by way of said projection.

9. Exposure controlling means as defined in claim 1, wherein said vane means comprises a single movable vane and said shutter means comprises a plurality of blades.

10. Exposure controlling means as defined in claim 1, wherein said output member is a needle which is pivotable between said positions thereof and further comprising a stationary back support adjacent to the path of movement of said needle, said scanning means being displaceable to clamp said needle against said back support.

References Cited
UNITED STATES PATENTS

| | | | |
|---|---|---|---|
| 3,338,145 | 8/1967 | Rentschler | 95—10 C |
| 3,213,771 | 10/1965 | Starp | 95—10 C |

SAMUEL S. MATTHEWS, Primary Examiner

M. H. HAYES, Assistant Examiner